United States Patent

Jouvaud et al.

[11] Patent Number: 5,166,950
[45] Date of Patent: Nov. 24, 1992

[54] PROCESS AND APPARATUS FOR MELTING A FURNACE CHARGE

[75] Inventors: Dominique Jouvaud, Paris; Nicolas Perrin, Boulogne Billancourt, both of France

[73] Assignee: L'Air Liquide, Societe Anonyme Pour Etude et L'Exploitation Des Procedes, Paris, France

[21] Appl. No.: 717,381

[22] Filed: Jun. 19, 1991

[30] Foreign Application Priority Data

Jun. 20, 1990 [FR] France .................................. 90 07698

[51] Int. Cl.$^5$ .......................................... H05B 11/00
[52] U.S. Cl. .................................. 373/2; 373/60; 373/85; 373/88; 110/214; 422/168; 266/186; 432/95
[58] Field of Search ............... 373/2, 22, 24, 60, 77, 373/79, 81, 85, 88, 95; 75/10.36, 10.45, 10.39; 266/156, 159, 186, 265, 266; 432/95, 168; 110/214

[56] References Cited

U.S. PATENT DOCUMENTS

| | | | |
|---|---|---|---|
| 3,423,080 | 1/1969 | Keyser | 373/88 |
| 3,459,867 | 8/1969 | Estes | 373/2 |
| 3,997,711 | 12/1976 | Stark et al. | 75/10.36 |
| 4,077,614 | 3/1978 | Udo et al. | 373/2 |
| 4,181,504 | 1/1980 | Camacho | 373/22 |
| 4,493,088 | 1/1985 | Lugscheider et al. | 373/22 |
| 4,635,568 | 1/1987 | Angelo | 110/214 |
| 4,730,336 | 3/1988 | Herneisen et al. | 373/2 |
| 4,740,989 | 4/1988 | Steipe et al. | 373/2 |
| 4,827,486 | 5/1989 | Brotzmann et al. | 373/2 |

FOREIGN PATENT DOCUMENTS 0257450 8/1986 European Pat. Off. .

Primary Examiner—Geoffrey S. Evans
Assistant Examiner—Tu Hoang
Attorney, Agent, or Firm—Curtis, Morris & Safford

[57] ABSTRACT

Process for melting a furnace charge, with post-combustion of the smokes by injecting an oxygenated gas in the furnace atmosphere as a series of jets flowing according to a tangential component in the space between electrodes and cylindrical furnace partition of the furnace, in a direction of injection so as to produce a rotary gas current about the vertical axis of the furnace and preferably in at least two series as two stepped levels to produce gas currents which rotate in opposite directions. Applications to electrical furnaces for the production of steel or ferro-alloys.

16 Claims, 1 Drawing Sheet

PROCESS AND APPARATUS FOR MELTING A FURNACE CHARGE

BACKGROUND OF INVENTION (a) Field of the Invention

The present invention concerns the melting of a charge in a furnace, for example an electrical furnace for melting scrap iron for the production of steel, of the type which uses an input of melting energy to the charge and with post-combustion of the smokes by injection of an oxygenated gas in the furnace space above the charge in the form of at least one first jet at a first horizontal level of the space and having at least one substantially tangential component with respect to a vertical axis of said space.

(b) Description of Prior Art

Such a process is described in EP-A-0.257.0450 or the equivalent U.S. Pat. No. 4,827,486, and simultaneously utilises a stirring of the bath and an injection of an oxygenated gas by means of fixedly mounted injectors located at a level at the top of the furnace.

SUMMARY OF INVENTION

The object of the present invention is to propose a process for the injection of an oxygen containing gas thereby improving, for example, for the post-combustion, the distribution of the oxygen containing gas with the combustion gases, and enabling to increase the duration of exchange between the oxygen containing gas and the combustion gases, for example CO and $H_2$ which escape from the charge, to ensure a maximum transfer of the energy formed, towards the metallic charge.

For this purpose, according to a characteristic of the invention, the oxygen containing gas is injected in the form of at least one second jet having a main component which is substantially tangential to a second level of the space, the first and second jets being oriented so as to constitute two oppositely directed rotary currents around the axis of the space.

According to other characteristics of the invention:

the jets of oxygen containing gas of a stepped series of jets undergo cyclic variations of the flow of oxygen containing gas;

the cyclic variations of the flows of oxygen containing gas from a series of jets are synchronized with one another;

the variations of the flows are of the pulsating type between a minimum flow and a maximum flow (that is, the flow of the oxygen containing gas injected by the injectors is not constant but varies cyclically between a maximum flow and a minimum flow which, for example, may be almost zero);

the cyclic variations of the flow of oxygen containing gas from a stepped series of jets are carried out at the same frequency as the cyclic variations of flow of oxygen containing gas of the stepped series of jets which is immediately adjacent thereto;

the cyclic variations of the series of jets of a plurality of stepped series of jets are carried out in synchronism (that is, are performed at substantially the same time).

In this manner, an accentuated and controllable turbulence of the oxygen containing gas with the gaseous products originating from the charge is ensured, and it can be adjusted to an optimal value corresponding to the post-combustion reaction which is as complete as possible.

The invention also concerns an apparatus for carrying out such process of the type comprising a space overhanging a charge into which emerges at a first horizontal level of the space, at least a first injector of oxygen containing gas which is oriented to give a jet having at least one component which is substantially tangential with respect to the vertical axis of the space, characterized in that it comprises at least a second injector of oxygen containing gas emerging into the space at a second horizontal level and oriented to deliver a jet having a substantially tangential main component which is oppositely directed with respect to the jet of the first injector.

BRIEF DESCRIPTION OF DRAWINGS

The characteristics and advantages of the invention will appear from the description which follows of a melting apparatus of the electrical furnace type, with reference of the annexed drawings in which.

DESCRIPTION OF PREFERRED EMBODIMENTS

Figure 1:
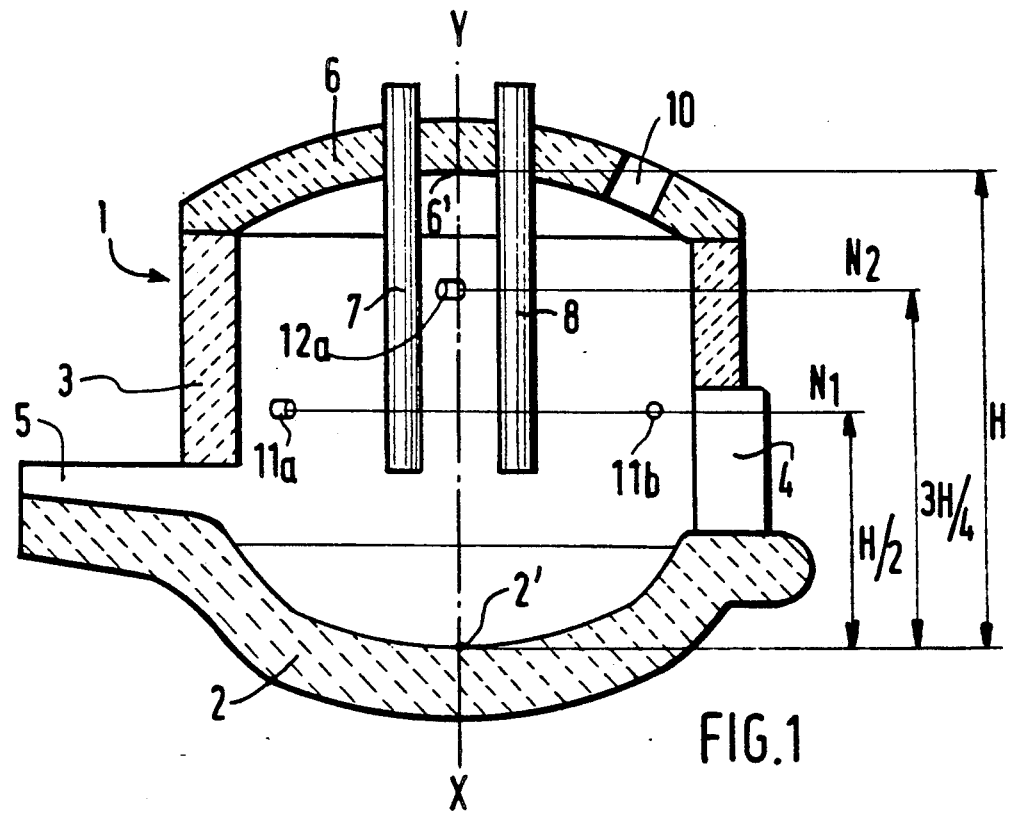
FIG. 1 is a vertical cross-section of an electrical furnace.
Figure 2:
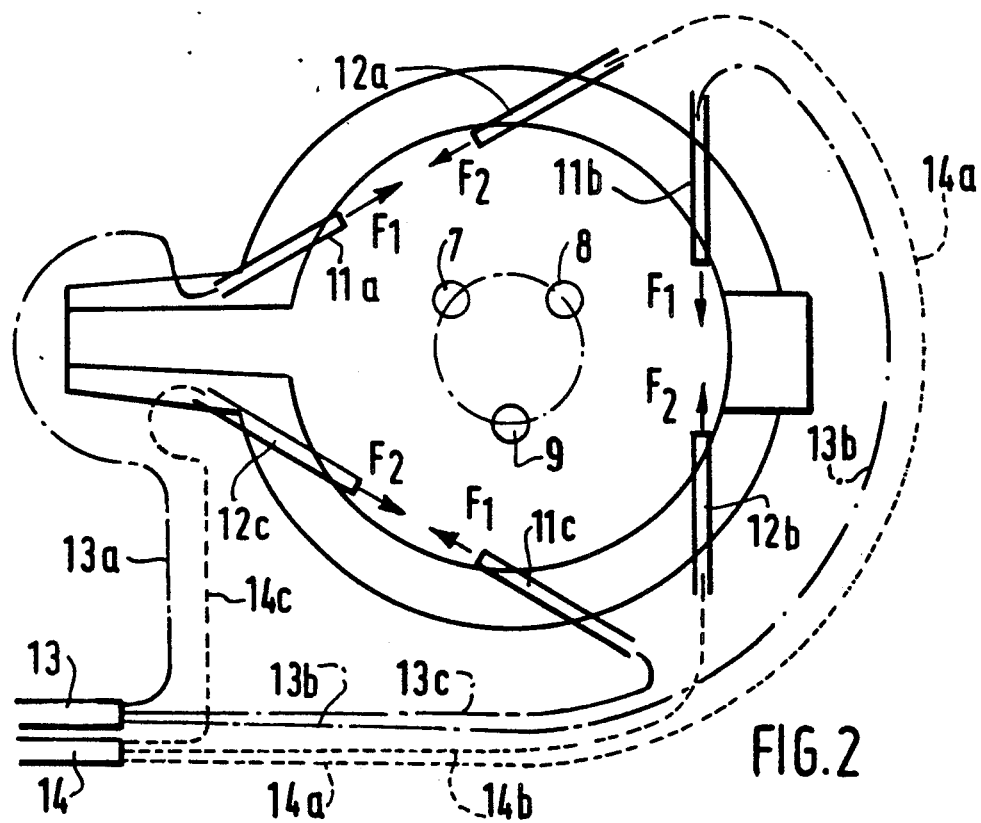
FIG. 2 is a horizontal cross-section of the same furnace.

With reference to the annexed figures, an electrical furnace 1 has a hearth 2, a lateral partition 3 with a so-called cleaning door 4 and a pouring jet 5 for the molten product, as well as a vault 6 also forming the support of three electrodes 7, 8, 9 which are also distributed around a vertical axis X-Y.

The furnace 1 is provided with at least two stepped series of at least two, typically at least three injectors of oxygen containing gas, respectively 11a, 11b, 11c, and 12a, 12b, 12c, the first series of injectors 11a, 11b, 11c being located at a level $N_1$ near half the height H between the lowest point 2' of the hearth 2 and the highest point 6' of the vault 6, while the second stepped series of injectors 12a, 12b, 12c is located at a level $N_2$ which represents approximately ¾ of this same height. The injectors 11a, 11b, 11c, on the one hand, 12a, 12b, 12c, on the other hand are therefore located in two stepped horizontal planes in which the vertical distance apart is of the order of one quarter of the maximum height H of the vault. Each injector is oriented so as to present a main tangential component and a radial centripetal component. The openings 11a, 11b, 11c, of the lower series of injectors at level $N_1 = H/2$ are all oriented, as viewed from above, in the direction of the hands of a watch, so as to form a lower current of gas with rotary circulation $F_1$ in the direction of the hands of a watch, the openings of the injectors 12a, 12b, 12c of the upper series of injectors at level $N_2 = 3H/4$ being all oriented, as viewed from above, in the opposite direction to the direction of the hands of a watch so as to form an upper current of gas with rotary circulation $F_2$ in a direction opposite to the direction of the hands of a watch.

The injectors at a same level (11a, 11b, 11c at level $N_1$)(12a, 12b, 12c at level $N_2$) are supplied by means of ducts 13a, 13b, 13c derived from a main duct 13, on the one hand, by means of ducts 14a, 14b, 14c derived from another duct 14 on the other hand so a to produce for example differences between cyclic flows of variations, for example pulsated flows, of the series of injectors 11a, 11b, 11c at level $N_1$ with respect to the series of injectors 12a, 12b, 12c at level $N_2$.

The process and apparatus described may be used not only in an electrical furnace for the production of steel but also for the production of ferro-alloys, in any melting or refining container for the production of metallic alloys and more generally in any container containing a liquid mass at high temperature producing gases which are not completely burned (metallurgy, glassware, cement manufacture).

We claim:

1. A process for melting a charge and post-combusting smokes in a furnace having a hearth containing the charge and a vault, in which a space having a vertical axis exists inside said furnace above the charge, the process comprising the steps of injecting in at least one horizontal plane of the space an oxygen-containing gas by way of at least first and second jets, each of said jets having at least one substantially tangential component with respect to the vertical axis, the first and second jets being oriented in opposite directions and being angularly spaced relative to the vertical axis.

2. The process according to claim 1, wherein the first and second jets include a first series and a second series of jets, respectively, in which each of said first and second series has at least two angularly spaced jets.

3. The process according to claim 2, wherein the jets of at least one series are pulsated.

4. The process according to claim 3, wherein the jets of each series are pulsated.

5. The process according to claim 4, wherein the jets are pulsated with a predetermined frequency between a maximum flow and a minimum flow of said oxygen-containing gas.

6. The process according to claim 5, wherein the frequency of pulsations of the jets of one series are dephased from each other.

7. The process according to claim 4, wherein pulsations of each of the jets of one series have a substantially similar frequency.

8. The process according to claim 7, wherein the frequency of pulsations of each of the jets of the first and second series is substantially the same.

9. The process according to claim 2, wherein the first series of jets is located at a first horizontal level in the space and the second series of jets is located at a second horizontal level in the space.

10. A furnace for melting a charge and post-combusting melting smokes, comprising a hearth for containing the charge and a vault, in which a substantially closed space having a vertical axis exists inside said furnace above the charge, and at least first and second injectors for introducing jets of an oxygen-containing gas in at least one horizontal plane of the space, the injectors being oriented so that the jets each have at least one substantially tangential component relative to the vertical axis, the first and second injectors being oriented in opposite directions and being angularly spaced relative to the vertical axis.

11. The furnace according to claim 10, wherein each of the injectors includes a respective series of angularly spaced injectors.

12. The furnace according to claim 11, wherein each said series of injectors is connected to a respective oxygen-containing gas supply means.

13. The furnace according to claim 12, wherein at least one of said supply means produces a pulsating flow of said oxygen-containing gas for supply to the respective series of injectors.

14. The furnace according to claim 11, wherein a first series of first injectors are located at a first horizontal level of the space and a second series of second injectors are located at a second horizontal level of the space.

15. The furnace according to claim 10, further comprising at least one melting electrode supported by the vault.

16. The furnace according to claim 13, further comprising at least one melting electrode supported by the vault.

* * * * *